3,540,998
PLURAL ADSORPTIVE TREATMENT

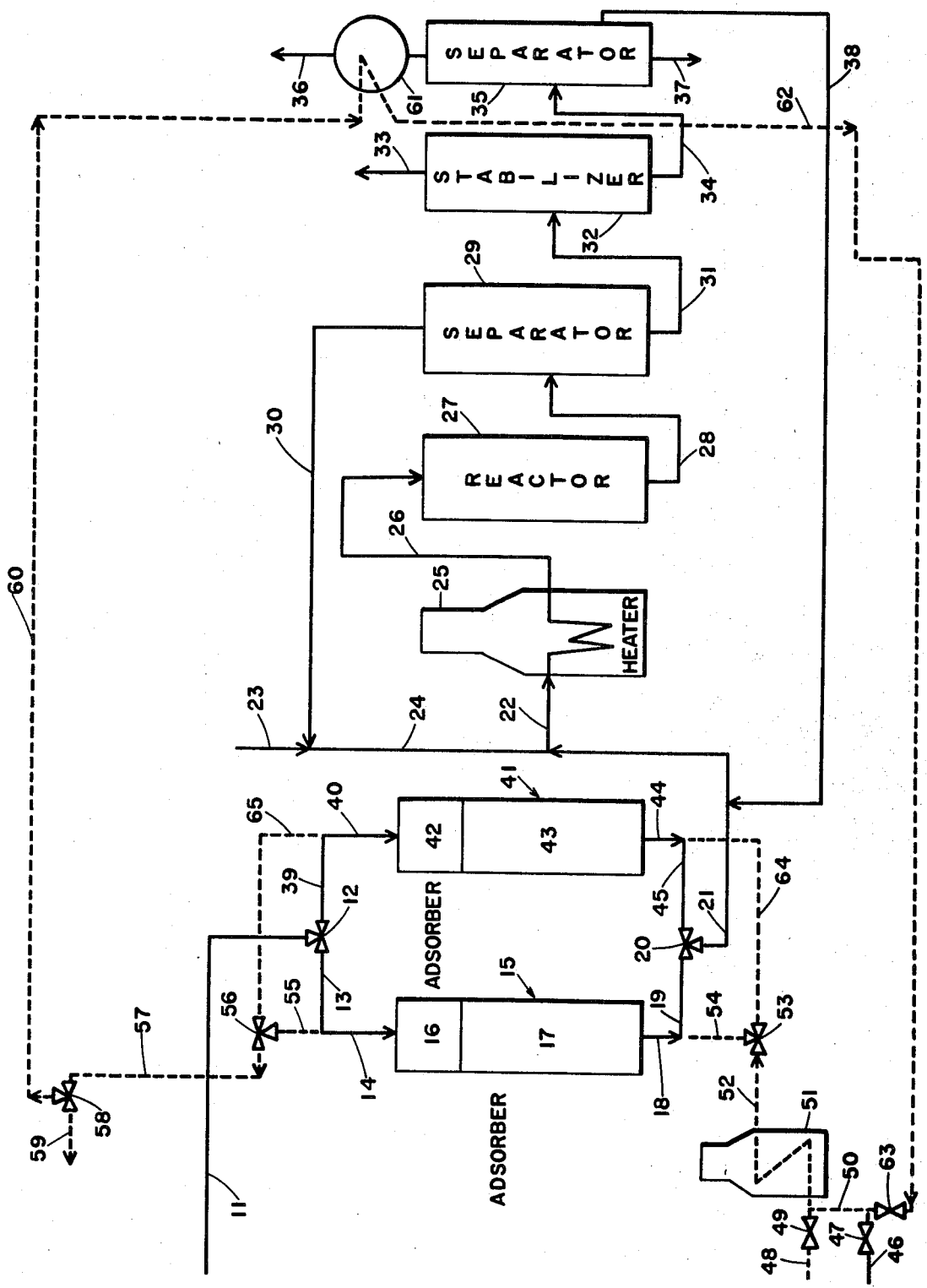

Paul G. Bercik, Beaumont, Tex., and Alfred M. Henke, Springdale, Pa., assignors to Gulf Research & Development Company, Pittsburgh, Pa., a corporation of Delaware
Filed Dec. 27, 1967, Ser. No. 693,880
Int. Cl. C07c *5/24;* C10g *25/04*
U.S. Cl. 208—91          10 Claims

ABSTRACT OF THE DISCLOSURE

A combination of solid adsorbents is provided for extended protection of isomerization catalysts from flame-front type deactivation.

---

This invention relates to the isomerization of relatively unbranched hydrocarbons to more highly branched forms. More particularly, this invention relates to the improvement of the overall efficiency of an isomerization process which may be operated for extended periods of time without the need for catalyst regeneration.

It has been proposed to isomerize hydrocarbons with a catalyst comprising alumina and a metalliferous hydrogenating component, which catalyst has been activated with such materials as sulfur chlorides, carbon chlorides and the like.

The feedstocks for such isomerization processes are, for example, commercially derived from natural gas sources and contain impurities such as sulfur, water, combined oxygen compounds and, in some instances, olefins in addition to the desired low molecular weight isomerizable hydrocarbons, e.g., n-butane, n-pentane, and n-hexane. In addition, the feedstocks may contain certain corrosion inhibitors. Such impurities are highly undesirable in the isomerization feedstock, since they will deactivate catalysts, such as those described above and render them unsuitable for use in the process. Although it has been proposed to pass the impurity-containing feedstock through an adsorption tower for the removal of large quantities of such impurities, enough of the impurities remain in the feed to cause a continued decrease in catalyst activity.

Eventually, the isomerization reactor unit must be shut down, so that the entire catalyst bed can be regenerated or replaced. Such an interruption is highly undesirable, since it is time-consuming to regenerate or replace the spent catalyst and it is costly to have the entire isomerization unit out of action.

It has been observed that the aforesaid impurities in the feedstock cause a phenomena, which may be termed "flame-front deactivation." Thus, the presence of such impurities cause a loss in isomerization catalyst activity which is indicated by a gradual deactivation of the catalyst bed and a corresponding loss in catalyst activity in the direction of flow of the feedstock through the reaction zone. The isomerization reaction is exothermic, and the temperature of the bed rises where the reaction begins. Thus, as the catalyst loses activity, the effective reaction zone advances in the direction of flow of the feedstock through the bed. By employing thermocouples at predetermined intervals along the catalyst bed, the temperature profile of the bed may be measured and the rate and location of the deactivating flame-front may be observed.

If the flame-front deactivation is permitted to continue, the entire catalyst bed becomes deactivated. However, in a commercial operation, the unit is ordinarily shutdown at a time prior to complete deactivation. The shutdown time is ascertained by a predetermined minimum isomer yield.

It has now been found that the disruptive effects of "flame-front deactivation" may be substantially diminished by the process of the present invention, whereby a process for the purification of an isomerizable hydrocarbon feedstock for isomerization in the presence of a catalyst comprising a major portion of alumina and containing a minor proportion of a metalliferous material having hydrogenation activity is provided, which process comprises sequentially contacting the isomerizable hydrocarbons in a plurality of adsorption zones wherein at least one of the zones contains a zeolitic molecular sieve adsorbent and at least one other of the zones contains an auxiliary solid adsorbent that is different from the molecular sieve adsorbent. Surprisingly, it has been found that the deleterious effects of flame-front deactivation can be obviated to a substantial degree, by contacting the impure isomerizable feed with a combination of adsorbents in a sequential manner, which adsorbents include a zeolitic molecular sieve adsorbent and at least one other adsorbent comprising an adsorptive solid other than a zeolitic molecular sieve.

The employment of this combination solid adsorbent pretreatment of the present invention can increase catalyst life by nearly a factor of two and result in longer periods between regeneration or replacement of catalyst, thereby reducing shutdown periods and catalysts costs.

Zeolitic molecular sieves are well known to the art and are available in both natural and synthetic forms. The materials may be characterized, generally, as metal aluminosilicates and have a crystalline structure which consists of three-dimensional frameworks of $SiO_4$ and $AlO_4$ tetrahedra, which are cross-linked by the sharing of oxygen atoms. The inclusion of a cation, such as ammonium ions, metal ions, amine complexes, hydrogen ions or the like maintains the electrovalent balance of the tetrahedra.

The zeolites may be activated by driving off substantially all of the water of hydration that is present and the space which remains in the crystals after activation is available for adsorption of molecules that have the size, shape and energy which permits their entry into the pores of the molecular sieves. A more detailed description of zeolitic molecular sieves can be found in U.S. Pat. 2,944,092.

A highly suitable zeolitic molecular sieve for present purposes is the molecular sieve known as "zeolite X," which has the following general formula:

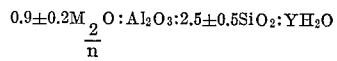

wherein M represents a metal, $n$ its valence, and Y may be any value between 0 and 8. Further description of the general preparation of synthetic zeolites of the X type can be found in U.S. Pat. 2,882,244. In addition to the synthetic X zeolites naturally occurring materials having similar properties, such as, for example, natural faujasites, can also be employed in accordance with our invention.

An especially preferred form of molecular sieve that may be employed in the process of the invention is the type 13X molecular sieve, which has a uniform effective pore size between about 10 and 11 angstrom units in diameter. The 13X sieve may be prepared by the reaction of a sodium silicate having a high ratio of sodium to silica, e.g., sodium metasilicate with a sodium aluminate having a soda-to-alumina ratio of from 1:1 to 3:1. The proportion of sodium silicate solution to sodium aluminate solution is preferably such that the ratio of silica to alumina in the final mixture is from about 4:1 to about 10:1.

The sodium aluminate solution is suitably added to the sodium metasilicate at ambient temperatures while employing rapid and efficient agitation so as to insure the formation of a precipitate of a substantially uniform composition throughout. The resulting homogeneous paste is heated to about 180° to 215° F. for a period as long as 200 hours or more to insure crystal formation with the desired pore size. After the heating period, the precipitated sodium aluminasilicate is filtered and water washed and then dried. Next, activation is achieved in a calcining zone at a temperature of about 700° to 900° F.

A zeolitic adsorption zone in accordance with our invention need not be comprised entirely of but one zeolite, but can contain a mixture of different zeolites. Thus, for example, in addition to a type 13X zeolitic molecular sieve, the adsorption zone could also contain a second type X zeolite, such as a type 10X or another type zeolite, such as a type 4A zeolite.

As previously mentioned, an auxiliary solid adsorbent is employed in conjunction with the molecular sieve, in serial flow relationship. Suitable auxiliary solid adsorbents for this purpose include non-zeolitic materials such as clay, carbon, alumina, magnesia, silica, silica-alumina and silica-magnesia. Clays such as bauxite are particularly suitable for use in the pretreatment process of the invention. However, Attapulgus clay is especially preferred. Attapulgus clay may be characterized by the chemical formula:

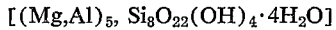

$$[(Mg,Al)_5, Si_8O_{22}(OH)_4 \cdot 4H_2O]$$

The relative amounts of zeolitic adsorbent and auxiliary adsorbent may be varied over a wide range. Suitable amounts of the solid adsorbents include between about one and about 10 volumes of zeolitic molecular sieve per volume of auxiliary solid adsorbent. Likewise, the operating conditions may be varied over a broad range. Suitable adsorption temperatures include those in the range of between about 0° and about 150° F., with effectiveness of adsorption increasing with lower temperatures. Accordingly, ambient temperature is a convenient operating temperature. Pressures suitable for adsorption include those in the range of between about 25 and 200 p.s.i.g., preferably between about 75 and about 130 p.s.i.g. A liquid hourly space velocity [LHSV] of between about 0.1 and about 20, preferably between about 0.25 and about 6.0 may be utilized for the pretreatment. Adsorption cycles of between about 2 and about 96 hours, preferably between about 6 and about 72 hours may be effectively employed.

The nature and objectives of the invention will be more readily understood by reference to the accompanying drawing.

Referring to the drawing, a feedstock containing low molecular weight isomerizable saturated hydrocarbons is introduced by means of the line 11, valve 12, line 13, and the line 14 into the adsorption unit 15. The process of the present invention is suitable for pretreating any impure straight-chain and slightly branched paraffins such as n-butane, n-pentane and n-hexane, as well as cycloparaffins, such as cyclohexane and its alkyl-substituted derivatives as well as the alkyl-substituted derivatives of cyclopentane that contain impurities which cause flame-front deactivation. Accordingly, these compounds may be derived from natural sources, and may be obtained from the fractional distillation of gasoline and naphtha cuts obtained from crude oils or reforming, for example. Impurities that cause flame-front deactivation are present in all of these sources. The process is especially suitable for the pretreatment of straight-chain paraffin hydrocarbons containing 4 to 6 carbon atoms per molecule which contain impurities that cause flame-front type deactivation.

Although it is not intended to limit the invention to any particular theory or mechanism, it appears that the molecular sieves are ineffective, alone, and an auxiliary adsorbent is required, since the sieve is incapable of removing certain oxygenated or other compounds that are either too large or too polar to be removed by the zeolitic molecular sieves.

The adsorption unit 15 is composed of the zone 16 and the zone 17, which contain Attapulgus clay and type 13X molecular sieves, respectively. Although the auxiliary clay adsorbent is provided ahead of the molecular sieve adsorbent in the drawing, the molecular sieve adsorbent may be placed ahead of the auxiliary adsorbent, if desired. However, it is preferred to place the auxiliary adsorbent ahead of the molecular sieves in the manner shown. Zone 16 contains 25 percent by volume of the clay and zone 17 contains 75 percent by volume zeolite molecular sieve based on the total adsorbent contained in the adsorption unit 15.

While only two adsorbent beds are illustrated in the drawing, three or more adsorbent beds may be employed, wherein alternative molecular sieve and auxiliary adsorbents may be provided in separate vessels, if desired, rather than in the same vessel, as illustrated.

The substantially purified feedstock is discharged from the adsorption unit 15 by means of the line 18 and is conducted by means of the line 19, valve 20 and line 21 to the line 22 wherein the isomerizable hydrocarbon is admixed with a hydrogen-containing gas which is introduced by means of the lines 23 and 24. A hydrogen to hydrocarbon molar ratio of between about 0.01 and about 10:1, preferably between about 0.05 and about 4:1 is utilized. The desired hydrogen to hydrocarbon ratio is suitably maintained by recycling gases which are separated from a high pressure isomerization product separator hereinafter described.

The isomerizable hydrocarbon-hydrogen mixture is introduced by means of the line 22 into the heater 25 wherein the temperature of the stream is raised to between about 100° and about 500° F., preferably between about 250° and about 450° F. The heated feedstock is passed by means of the line 26 to an isomerization reactor 27 which is preferably maintained under adiabatic conditions, i.e., without the addition or withdrawal of heat.

The reactor 27 may be suitably provided with an activated catalyst that may be derived from any form of porous alumina suitable for use as a catalytic agent or support. For example, excellent results are obtainable with aluminas prepared by calcining a beta-alumina trihydrate such as bayerite or mixtures thereof with other alumina hydrates. Aluminas prepared by calcining other hydrated aluminas, such as the amorphous alumina formed by hydrolysis of aluminum methoxide, or crystallized alumina hydrates, such as alpha-alumina trihydrate are also suitable. These catalysts can also contain metals from the left-hand column of Group VI or from Group VIII of Mendelyeev's Periodic Table. Examples of suitable materials are platinum, rhodium, palladium, nickel and tungsten. Especially good results are obtainable with platinum and palladium. In general, the hydrogenating component will be present in amounts in the range from about 0.01 to about 5.0 percent by weight of the catalyst, and preferably from about 0.1 to about 2.5 percent, particularly in the case of noble metal components. By way of example, excellent results are obtainable within 0.2 and 0.7 percent platinum or 1 percent palladium on alumina.

The hydrogenating component can be composited with the alumina in any convenient way. Thus, the hydrogenating component can be deposited on a precalcined alumina support in the form of a water solution of a water-soluble salt, following which the wetted base can be calcined. Examples of such solutions are solutions containing chloroplatinic acid or other halogen platinum acids, or water solutions of nickel and tungsten nitrate in the desired proportion with respect to one another. Alternatively, the hydrogenating component can be added as a salt to the aluminum hydrate and then precipitated with a substance such as hydrogen sulfide and calcining, or calcining alone. Additionally, an aqueous metal sulfide sol, for example, a platinum sulfide sol, can be used to impregnate an alumina hydrate or admixed with an alumina solution prior to drying and calcining.

The activity of such catalysts may be further enhanced by treatment with hydrogen chloride and then a sulfur chloride, such as in the manner disclosed in U.S. Pat. No. 3,322,689 of Giannetti et al., the disclosure of which is hereby incorporated by reference. Thus, the composite catalyst may be treated with hydrogen chloride and subsequently treated with a sulfur chloride, such as thionyl chloride or sulfur monochloride. Another suitable method for activating such catalysts is disclosed in U.S. patent application Ser. No. 588,744 filed on Oct. 24, 1966, now U.S. Pat. No. 3,441,514, the disclosure of which is also incorporated by reference. According to the activation method of that application, such catalysts may be activated by treatment with a sulfur chloride and oxygen-containing gas at a critical temperature of between about 750° and about 1100° F. to obtain a high degree of activation. Additional methods for preparing catalysts suitable for use in the present isomerization process are disclosed in U.S. patent application Ser. No. 561,710 filed on June 30, 1966, now U.S. Pat. No. 3,419,503, and application Ser. No. 604,180 filed on Dec. 23, 1966.

Regardless of the method of compositing the starting catalyst base, the noble metal hydrogenating components are advantageously converted to a reduced form prior to the pretreatment with hydrogen chloride or the activation treatment with a sulfur chloride. In the case of base metals such as nickel and tungsten, the hydrogenating component can remain in the form of a sulfide or oxide prior to any further activation, such as a hydrogen chloride pretreatment and/or a sulfur chloride activation treatment.

It is also important that the hydrogenating component be composited with the alumina base before hydrogen chloride pretreatment or sulfur chloride activation treatment, as deposition thereafter normally will result in a reduction of the chlorine content of the sulfur chloride treated base. This is undesirable, as the activity of the catalyst appears to be generally related to the increase in chlorine content attributable to sulfur chloride activation treatment.

The catalyst base may contain halogen other than that incorporated by a sulfur chloride treatment. For example, some halogen content may result from the use of an aluminum halide as a starting material to form the alumina base or alternatively, some halogen may remain in the catalyst owing to the use of a halogen-noble metal acid.

Although a single isomerization reactor 27 is illustrated in the drawing, the isomerization catalyst may be distributed among a plurality of catalyst beds in a multiple-bed type reactor, with a minor portion of the catalyst being provided in the first catalyst bed and a major portion of the catalyst being provided in the subsequent catalysts beds. Likewise, the average reaction temperature of the reaction zones may be regulated by providing inter-stage coolers when a plurality of catalyst zones are employed. The reactor outlet temperature of each reactor may be maintained substantially the same, or may be lowered in a descending order so as to increase the yield of isomeric product.

Any suitable isomerization conditions may be utilized in the reactor 27. For example, suitable reaction temperatures include those between about 100° and about 500° F., preferably between about 250° and about 450° F. Suitable pressures include those between about atmospheric pressure and about 2000 p.s.i.g., preferably between about 300 and about 1000 p.s.i.g. The space velocity may be between about a LHSV of 0.05 and about 10, preferably between about 0.5 and about 4.0.

The effluent from the reactor 27 is conducted by means of the line 28 to the high pressure separator 29 wherein a hydrogen-containing recycle gas is withdrawn by means of the line 30 and is combined with dried, make-up hydrogen which is introduced by means of the line 23 and the combined stream is passed to the heater 25. The effluent from the separator 29 is passed by means of the line 31 to the stabilizer 32 wherein a $C_3$ and lighter fraction is removed by means of the line 33 and isomer product-containing stream is discharged by means of the line 34. The product stream is introduced into the product separator 35 from which the isomeric product, e.g., isobutane is recovered by means of the line 36, while higher boiler materials, such as pentanes are discharged from the separator by means of the line 37. The unreacted isomerizable hydrocarbons, such as normal butane, are recycled to the heater 25 by means of the lines 38, 21 and 22 for further reaction in the reactor 27.

At a predetermined time, when the adsorbents in the adsorption unit 15 become substantially spent with impurities, the isomerization feed which is introduced by means of the line 11 is passed by means of the three-way valve 12, the line 39 and the line 40 into the alternate adsorptioin zone 41, which contains the adsorption zones 42 and 43. In this manner, a continuous operation of the process may be effected without substantial interruption, since the adsorption unit 15 may be regenerated while the alternate adsorption unit is utilized. The isomerizale feed that enters the adsorption unit 41 passes through a clay treating zone 42 and a zeolitic molecular sieve treating zone 43. The treated feed is discharged from the adsorption unit by means of the line 44, and is passed by means of the line 45, and the valve 20 to the line 21 from which it is conducted to the isomerization reactor as before.

The adsorption unit 15 may be regenerated by providing a heated mixture of nitrogen, which is introduced by means of the line 46 and valve 47, and refinery gas, which is introduced by means of the line 48 and the valve 49. The gaseous admixture is passed by means of the line 50 through a heater 51, wherein the mixture is heated to a temperature of between about 100° and about 1500° F., preferably between about 500° and about 1000° F. The heated regeneration gas is passed by means of the line 52, valve 53, line 54 and line 18 to the adsorption unit 15 wherein regeneration of the solid adsorbents therein is effected. The regeneration gas and impurities are discharged from the unit 15 by means of the line 14 and are passed by means of the line 55, valve 56, line 57, valve 58 and the line 59 from which the gas may be passed to a gas storage means (not shown). A portion of the regeneration gas in the line 57 may be recycled by means of the valve 58, line 60, heat exchanger 61, line 62 and valve 63 for further use in the regeneration of the adsorbent units.

The regenerated adsorption unit 15 is placed on-stream at the time the adsorption unit 41 becomes substantially deactivated. At this time the feed in the line 11 is passed through the unit 15 as previously described and the heated regeneration gas in the line 52 is conducted by means of the valve 53, line 64, and line 44 to the spent adsorption unit 41. The regeneration gas and impurities are then passed by means of the line 40, line 65, valve 56, line 57, and valve 58 to storage or recycle as before.

The employment of a multi-zoned adsorption unit containing a plurality of adsorbents, such as Attapulgus clay and type 13X molecular sieves in the manner illustrated will provide continuous protection of the catalyst beds from flame-front deactivation for extended periods of time, and can substantially increase the catalyst life, as compared with the employment of the molecular sieve adsorbent, alone, for pretreatment of the feed.

This invention may be best understood by reference to the following specific examples, which are illustrative only and are not intended to be limiting as to scope. All of the percentages indicated are by weight, unless otherwise specified.

EXAMPLE 1

A commercial naphtha reforming catalyst containing 0.6 percent platinum on an alumina base, having a chloride content of 0.6 percent and a surface area of about 425 square meters per gram is calcined at a temperature of 550° F. overnight and at 900° F. for two hours. This catalyst is reduced in a stream of hydrogen at 900° F. for two hours. The hydrogen flow rate utilized is 1.5 standard cubic feet per hour per 100 grams of catalyst. The reduced catalyst is purged over a period of six hours in a flow of prepurified nitrogen.

The temperature of the catalyst is then raised to 1050° F. in nitrogen and 0.03 mole of hydrogen chloride per 100 grams of catalyst is passed over the catalyst for a period of one hour. The temperature is then reduced to 560° F. with nitrogen and 0.09 mole of sulfur monochloride ($S_2Cl_2$) per 100 grams of catalyst is passed over the catalyst for a period of two and one-half hours.

The temperature is then reduced to 400° F. and 0.09 mole of hydrogen chloride per 100 grams of catalyst is passed over the catalyst for a period of three hours. The catalyst is then cooled.

EXAMPLES 2–6

Employing an arrangement similar to that illustrated in the drawing, the catalyst of Example 1 is provided in a single adiabatic reactor. A feedstock comprising normal butane and between about 25 and 50 parts per million sulfur and about 25 to 150 parts per million water along with other unidentifiable impurities is employed. For the purpose of comparison, two separate adsorption vessels are employed. One vessel contains a single bed of Attapulgus clay and a single bed of type 13X molecular sieves along with a small amount of type 4A molecular sieves. The clay constiutes about 25 percent by volume of the total adsorbent, while the molecular sieves constitute about 75 percent of the adsorbent inventory.

The second adsorption vessel contains only molecular sieves of the type 13X and 4A variety in the same proportion as contained in the molecular sieve bed of the first adsorption vessel. No clay is used therein.

The feed is passed through the adsorption vessels in one continuous run with the feed being switched from the beds of Attapulgus clay and molecular sieves to the single bed containing only sieves at the intervals indicated in the Table 1 below. The thermocouples are strategically placed in the catalyst beds to measure the rate of flame-front type deactivation for each of the treated feedstocks.

The feed is passed through the adsorption beds at room temperature and at a liquid hourly space velocity of 0.8, while employing a three-day cycle. The effluent from each of the adsorption units contains about one part per million or less of sulfur and about one part per million or less estimated water.

The isomerization conditions which are employed include a butane partial pressure of 365 p.s.i.g., a liquid hourly space velocity of 2.0 and a 200 to 250 parts per million chloride addition, based upon the total feed. A completely recycle-type operation is employed, and a hydrogen-containing gas comprising 95 percent hydrogen and 5 percent methane is utilized.

The results of the various runs are set forth below:

twice that value or 0.36 percent of the total catalyst per day for the 57 to 71 Catalyst Age Days period when only the 13X molecular sieves are employed. As a further check, the feed is passed through the combination adsorbent for the 71 to 86 Catalyst Age Days period and the deactivation rate of 0.18 percent of the total catalyst per day is again obtained.

Of particular significance is that the sulfur and water impurity level of the adsorbent-treated feed is about the same for the combination adsorbents and for the single adsorbent. Notwithstanding this fact, the flame-front catalyst deactivation is greatly reduced by the employment of the adsorptive combination of the present invention.

EXAMPLE 7

The catalyst of Example 1 is distributed in three reactors that are connected in a serial manner. The first reactor contains 25 percent of the total catalyst inventory, while the second and third reactors contain 25 and 50 percent, respectively.

A feedstock comprising commercially derived normal butane which contains between 25 and 50 parts per million sulfur and between 25 and 150 parts per million water is passed through an adsorption unit that contains a bed of Attapulgus clay and a separate bed of type 13X molecular sieves, in the proportion of 25 percent by volume and 75 percent by volume, respectively. The sulfur content is lowered to about 1 part per million and the water content is lowered to about 0.4 to 2 parts per million.

The adsorbent-treated feed is blended with a gas comprising 95 percent hydrogen and 5 percent methane and the resultant mixture is heated to a temperature of 296° F. The preheated mixture is passed through the multiple-bed reactors at a liquid hourly space velocity of 2.0. Chloride is added to the charge to the reactors in the amount of 200 parts per million based upon the total feed. A hydrogen partial pressure of 75 p.s.i.a., a butane+ partial pressure of 365 p.s.i.a. and total reactor pressure of 430 p.s.i.a. are employed. The effluent from each of the reactors is cooled for the removal of the exothermic heat of reaction.

The operating conditions and results are set forth in Table 2 below:

TABLE 2

|  | Initial temp., °F. | Final temp., °F. | Average |
|---|---|---|---|
| Reactor 1: | | | |
| Inlet | 307 | 307 | 307 |
| Outlet | 345 | 307 | 326 |
| Reactor 2: | | | |
| Inlet | 323 | 307 | 315 |
| Outlet | 330 | 345 | 337.5 |
| Reactor 3: | | | |
| Inlet | 307 | 315 | 311 |
| Outlet | 315 | 330 | 322.5 |
| Distribution of isobutane in C₄ product, wt. percent | 62.7 | 62.0 | 62.3 |

TABLE 1

| Example No.: | Catalyst outlet temperature, °F. | Hydrogen partial pressure, p.s.i.a. | Catalyst age, days | Distribution of isobutane in reactor effluent, percent vol. | Rate of flame-front catalyst deactivation, percent wt. total catalyst per day | Adsorbent composition, percent by volume | |
|---|---|---|---|---|---|---|---|
| | | | | | | Attapulgus clay | 13X sieves |
| 2 | 360–375 | 150 | 50–57 | 56-3–58.4 | 0.18 | 25 | 75 |
| 3 | 375 | 150 | 57–71 | 58.4 | 0.31 | 0 | 100 |
| 4 | 375 | 150 | 71–86 | 58.4–57.8 | 0.18 | 25 | 75 |
| 5 | 390–410 | 150 | 98–116 | 56.7 | 0.00 | 25 | 75 |
| 6 | 390 | 75 | 116–128 | 57.9 | 0.00 | 25 | 75 |

As may be seen from the results which are tabulated in Table 1, the deactivation rate is 0.18 percent of the total catalysts per day for the period 50 to 57 Catalyst Age Days when the adsorbent combination of the present invention, i.e. clay and type 13X molecular sieves is employed. However, the deactivation rate climbs to nearly The first reactor is deactivated in about 3.2 months and no deactivation occurs in the second and third reactors.

The following example illustrates the utilization of a single-bed unit under the same conditions as the previous example.

EXAMPLE 8

A single-bed unit is tested employing the same feedstock catalyst, operating conditions, of Example 7. The same combination of adsorbents that were used in the previous Example 7 is employed to pretreat the n-butane feed. The results are set forth in Table 3, below:

TABLE 3

|  | Initial temp., °F. | Final temp., °F. | Average |
|---|---|---|---|
| Single-Bed unit: | | | |
| Inlet | 270 | 325 | 297.5 |
| Outlet | 345 | 370 | 357.5 |
| Distribution of isobutane in C₄ product, wt. percent | 60.9 | 56.0 | 58.5 |

The single-bed unit is completely deactivated in 9.6 months when measured on the same basis as the deactivated unit of the previous example.

The following examples are for comparative purposes and illustrate the employment of only a single adsorption bed.

EXAMPLE 9

The catalyst of Example 1 is again distributed in three reactors that are connected in a manner which is similar to the arrangement of Example 7. The first reactor contains 25 percent, the second reactor contains 25 percent, and the third reactor contains the remaining 50 percent of the total catalyst inventory.

A feedstock comprising commercially derived normal butane which contains between about 25 and 50 parts per million of sulfur, and between about 25 and 150 parts per million water is passed through a bed of type 13X molecular sieves which lowers the sulfur content of the feed to about 1 part per million and the water content to about 0.4 to 2 parts per million based upon the total butane feed. No auxiliary adsorbent bed is utilized.

Next, the treated feed is blended with a gas comprising 95 percent hydrogen and 5 percent methane and the resultant mixture is preheated to a temperature of 296° F. The preheated mixture is passed through the reactors at a liquid hourly space velocity [LHSV] based upon the total feed of 2.0 volumes per volume per hour. A hydrogen partial pressure of about 150 p.s.i.a., a butane+ partial pressure of 365 p.s.i.a., and a total reactor pressure of 523 p.s.i.a. are employed. Chloride is added to the charge to the reactors in an amount of 200 parts per million based upon the total feed.

The reactor temperatures and corresponding conversion of normal butane in the feedstock are measured. The results are set forth in Table 4 below:

TABLE 4

|  | Initial temp.¹, °F. | Final temp.², °F. | Average |
|---|---|---|---|
| Reactor 1: | | | |
| Inlet | 296 | 303 | 299.5 |
| Outlet | 317 | 304 | 310.5 |
| Reactor 2: | | | |
| Inlet | 317 | 304 | 310.5 |
| Outlet | 343 | 335 | 339 |
| Reactor 3: | | | |
| Inlet | 343 | 335 | 339 |
| Outlet | 358 | 361 | 359.5 |
| Distribution of isobutane in C₄ product, wt., percent | 60.0 | 60.0 | 60.0 |
| Gas make, wt., percent of total feed | 1.2 | 1.2 | 1.2 |

¹ Measurement taken after initial 34.4 percent of the guard catalyst is deactivated.
² Measurement taken after guard catalyst completely deactivated.

In the foregoing multi-bed operation, the first reactor requires regeneration after only 30 days of operation.

The following example illustrates the employment of a single catalyst bed in combination with a single adsorbent pretreatment stage.

EXAMPLE 10

For comparative purposes, the catalyst of Example 1 is provided in a single-bed reactor. A feedstock having a composition identical to that of Example 2 is mixed with a gas composed of 95 percent hydrogen and 5 percent methane after being pretreated with type 13X molecular sieves, only, and being preheated to a temperature of 296° F.

The heated mixture is passed through the reactor at a liquid hourly space velocity equal to that of the previous example, viz., 2.0. Likewise, an identical hydrogen partial pressure, butane+ partial pressure and total reactor pressures are employed. Chloride is added in the amount of 200 parts per million based on the total feed. The reactor is employed adiabatically and the operating temperatures and corresponding conversion are measured. The results are set forth in Table 5, below:

TABLE 5

|  | Initial temp.¹, °F. | Final temp.², °F. | Average |
|---|---|---|---|
| Single-Bed Unit: | | | |
| Inlet | 296 | 347 | 321.5 |
| Outlet | 358 | 410 | 384 |
| Distribution of isobutane in C₄ product, wt., percent | 60.0 | 66.6 | 58.3 |
| Gas make, wt., percent of total feed | 1.2 | 1.9 | 1.6 |

¹ Measurement taken after initial 8.6 percent of the catalyst is deactivated.
² Measurement taken after initial 64 percent of the catalyst is deactivated.

In the foregoing single-bed operation, the entire single-bed unit is deactivated in only 75 days.

A comparison of the results obtained in Examples 7, 8, 9 and 10 indicate that deactivation of the catalyst beds by flame-front type deactivation is prevented for longer periods of time when a combination of solid adsorbents is employed, as compared with the pretreatment of the feed with only a single adsorbent, e.g., a type 13X molecular sieve.

Many details have been omitted from the drawing and the written description of the invention in the interests of simplicity and clarity, as for example, compressors, pumps, valves, automatic control devices, etc., all of which are well known in the art.

Obviously many modifications and variations of the invention as hereinabove set forth can be made without departing from the spirit and scope thereof, and therefore, only such limitations should be imposed as are indicated in the appended claims.

We claim:

1. In a process wherein an isomerizable normal paraffin containing hydrocarbon feedstock is isomerized in the presence of a catalyst comprising a major proportion of a metalliferous material having hydrogenating activity, the improvement which comprises sequentially contacting an impure normal paraffin containing hydrocarbon feedstock in a plurality of adsorption zones disposed in a serial flow relationship, under conditions such that substantially no reduction in normal paraffin content takes place in said feedstock, wherein the impure hydrocarbon feedstock and the substantially purified feedstock have the same direction of flow through said zones, at least one of said zones containing an X type zeolite molecular sieve absorbent and at least one other of said zones containing an auxiliary solid absorbent other than a molecular sieve absorbent, said absorbents being effective in the removal of impurities that cause flame-front deactivation of said catalyst, and thereafter isomerizing said substantially purified feedstock.

2. The process of claim 1 wherein the molecular sieve adsorbent is a type 13X molecular sieve.

3. The process of claim 1 wherein the molecular sieve adsorbent comprises type 13X and type 4A molecular sieves.

4. The process of claim 1 wherein at least one of the adsorbent zones is provided with a solid adsorbent selected from the group consisting of clay, carbon, alumina, magnesia, silica, silica-alumina and silica-magnesia.

5. The process of claim 4 wherein the adsorbent is Attapulgus clay.

6. The process of claim 1 wherein two adsorbent zones are employed with one of the adsorbent zones containing Attapulgus clay and a second adsorbent zone containing type 13X molecular sieve adsorbent.

7. The process of claim 6 wherein between about one and about 10 volumes of molecular sieve adsorbent per volume of clay adsorbent are employed.

8. The process of claim 7 wherein about 3 volumes of molecular sieve per volume of clay is employed.

9. The process of claim 1 wherein the metalliferous material comprises platinum.

10. The process of claim 9 wherein the catalyst is sulfur chloride activated platinum on alumina.

References Cited

UNITED STATES PATENTS

| | | | |
|---|---|---|---|
| 2,909,583 | 10/1959 | Bleich | 260—683.73 |
| 2,937,215 | 5/1960 | Bleich et al. | 208—91 |
| 2,939,833 | 6/1960 | Wankat et al. | 208—91 |
| 2,966,531 | 12/1960 | Louis. | |
| 3,063,934 | 11/1962 | Epperly et al. | 208—91 |
| 3,094,569 | 6/1963 | Thomas | 260—676 |
| 3,321,396 | 5/1967 | Dryer et al. | 208—310 |

HERBERT LEVINE, Primary Examiner

U.S. Cl. X.R.

208—310; 260—683.65, 683.73

UNITED STATES PATENT OFFICE
CERTIFICATE OF CORRECTION

Patent No. 3,540,998　　　　　　　Dated November 17, 1970

Inventor(s) Paul G. Bercik and Alfred M. Henke

It is certified that error appears in the above-identified patent and that said Letters Patent are hereby corrected as shown below:

Column 6, line 10, "isomerization" should be --isomerizable--

Column 6, line 13, "adsorptioin" should be --adsorption--.

Column 6, lines 17 and 18, "isomerizale" should be --isomerizable--.

Column 7, line 27, "constiutes" should be --constitutes--.

Column 7, Table 1, under column headed "Distribution of Isobutane, etc.", Example No. 2, "56-3-58.4" should be --56.3-58.4--.

Column 10, Table 5, under column headed "Final Temp.$^2$°F., wt., percent, "66.6" should be --56.6--.

Signed and sealed this 30th day of March 1971.

(SEAL)
Attest:

EDWARD M.FLETCHER,JR.　　　　　　WILLIAM E. SCHUYLER, JR
Attesting Officer　　　　　　　　Commissioner of Patents